L. GARNIER.
VEHICLE WHEEL.
APPLICATION FILED FEB. 5, 1908.
939,681.
Patented Nov. 9, 1909
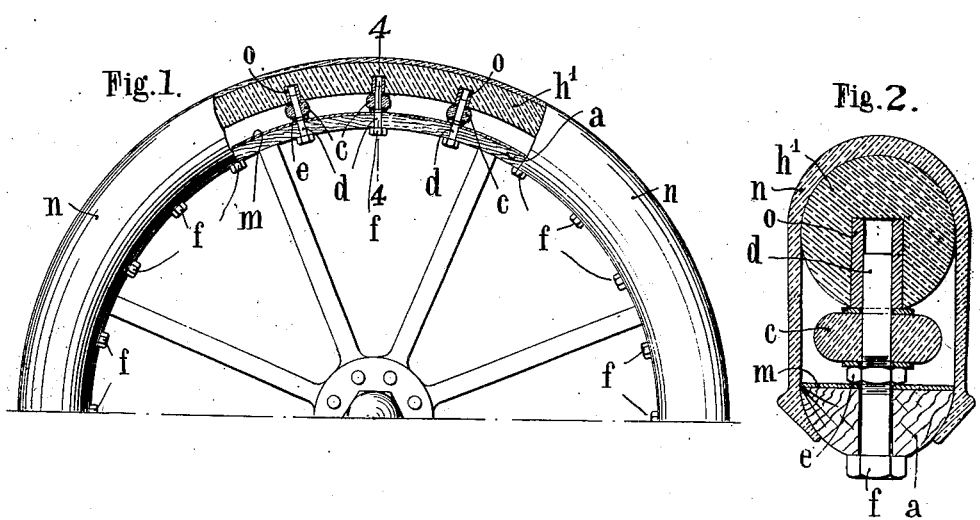
Witnesses
C. Heymann
Inventor
Louis Garnier
by B. Singer
Atty

UNITED STATES PATENT OFFICE.

LOUIS GARNIER, OF CLERMONT-FERRAND, FRANCE.

VEHICLE-WHEEL.

939,681.

Specification of Letters Patent.

Patented Nov. 9, 1909.

Application filed February 5, 1908. Serial No. 414,366.

*To all whom it may concern:*

Be it known that I, LOUIS GARNIER, a citizen of the Republic of France, and resident of 6 Rue Delaure, Clermont-Ferrand, Puy-de-Dôme, France, have invented an Improvement in Vehicle-Wheels, of which the following is a description.

This invention relates to improvements in elastic wheels of that class wherein the tread portion is separated and yieldingly supported upon the felly by elastic means interposed therebetween and wherein means are provided for preventing circumferential displacement of the tread portion with respect to the felly.

According to my invention the felly is provided with a plurality of radially disposed rods, which may be in the form of bolts, and which are secured rigidly at their inner ends to the felly and project loosely through the tread portion with sufficient freedom of play to permit of the requisite yielding action of the tread with respect to the felly and to prevent undue circumferential displacement of the tread.

A further object of the invention is the provision of elastic masses of solid cushioning element which are preferably disposed about the rods or bolts and interposed between the felly and tread to afford radial inward movement of the tread under stress and normally maintain the tread in concentric relation with respect to the felly.

The invention will be more fully described in connection with the accompanying drawing and will be more particularly pointed out in and by the appended claims.

In the drawing:—Figure 1 is a side elevation of a portion of a wheel with parts broken away showing my invention applied thereto. Fig. 2 is a sectional view on line 4—4 of Fig. 1.

Like letters of reference designate similar parts throughout the drawing.

$a$ designates a felly of the wheel which may be provided with a peripheral metallic band $m$.

As shown by the drawing, the tread portion comprises a rim $h'$ of solid rubber or some other yielding material. A sheath $n$ incloses said tread portion and is fastened to the felly in any desired way. A plurality of solid rubber cushions $c$ are disposed in the annular interspace between the rim $h'$ and the felly $a$. In order to maintain said cushioning elements in place a plurality of radially disposed rods are provided and as shown said rods are in the form of bolts $d$ which project through the cushioning elements $c$ into the tread so as to prevent circumferential displacement of the tread with respect to the felly and hold the elements $c$ in place. Said bolts $d$ are anchored at their inner ends to the felly $a$ and as shown the bolts $d$ are provided with heads $f$ which engage the inner peripheral portions of the felly $a$ and nuts $e$ which may be turned down on the band $m$ to clamp the bolts $d$ to the felly $a$. By anchoring the bolts $d$ at their inner ends to the felly $a$, the stress to which the bolts are subjected is sustained wholly by the solid wheel structure and the result is a very durable and rigid construction.

The tread $h'$ is provided with a plurality of apertures in which bearing sleeves $o$ are disposed for the purpose of receiving the bolts $d$, which slidingly project into said sleeves $o$, and which are adapted to prevent peripheral displacement of the cushions $c$.

I claim:—

1. In combination, a wheel provided with a felly, bolts extending through said felly and projecting radially therefrom, means for anchoring the inner ends of said bolts to said felly, cushioning masses surrounding said bolts and supported by said felly, a solid tire mounted on said masses and provided with openings receiving the outer free ends of said bolts, and sleeves in said openings supported on said masses and extending radially beyond the outer ends of said bolts, substantially as described.

2. In combination, a wheel provided with a felly, bolts extending through said felly and projecting radially therefrom, means for anchoring the inner ends of said bolts to said felly, cushioning masses surrounding said bolts and supported by said felly, a solid tire mounted on said masses and provided with openings receiving the outer ends of said bolts, sleeves in said openings supported on said masses and extending radially beyond the outer ends of said bolts, and a protecting sheath covering said tire and extending inwardly therefrom about said felly.

In testimony whereof I affix my signature in presence of two witnesses.

LOUIS GARNIER.

Witnesses:
 DEAN B. MASON,
 VICTOR NATRAY.